J. RAU.
GLASS DISCHARGING MECHANISM.
APPLICATION FILED SEPT. 10, 1918.

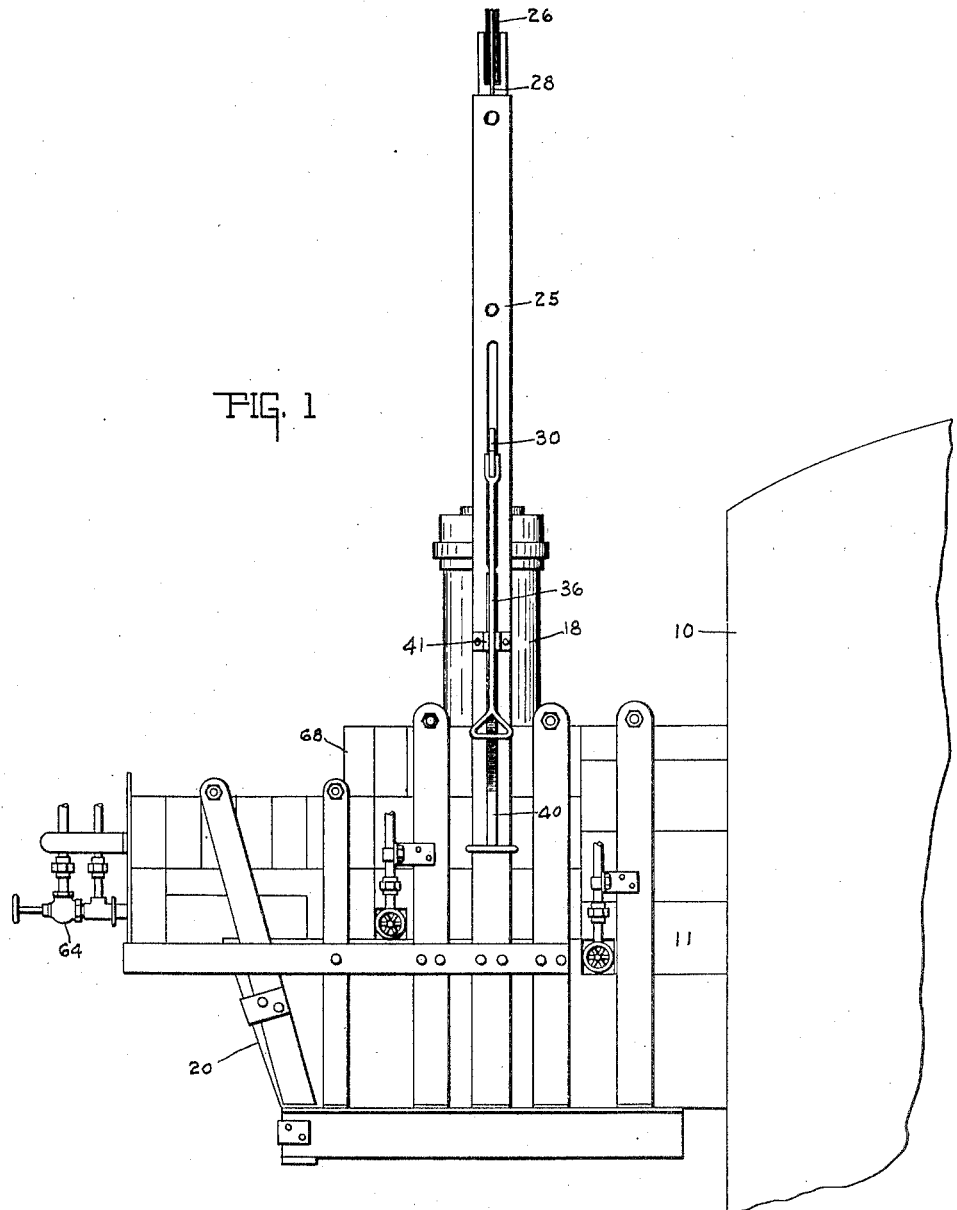

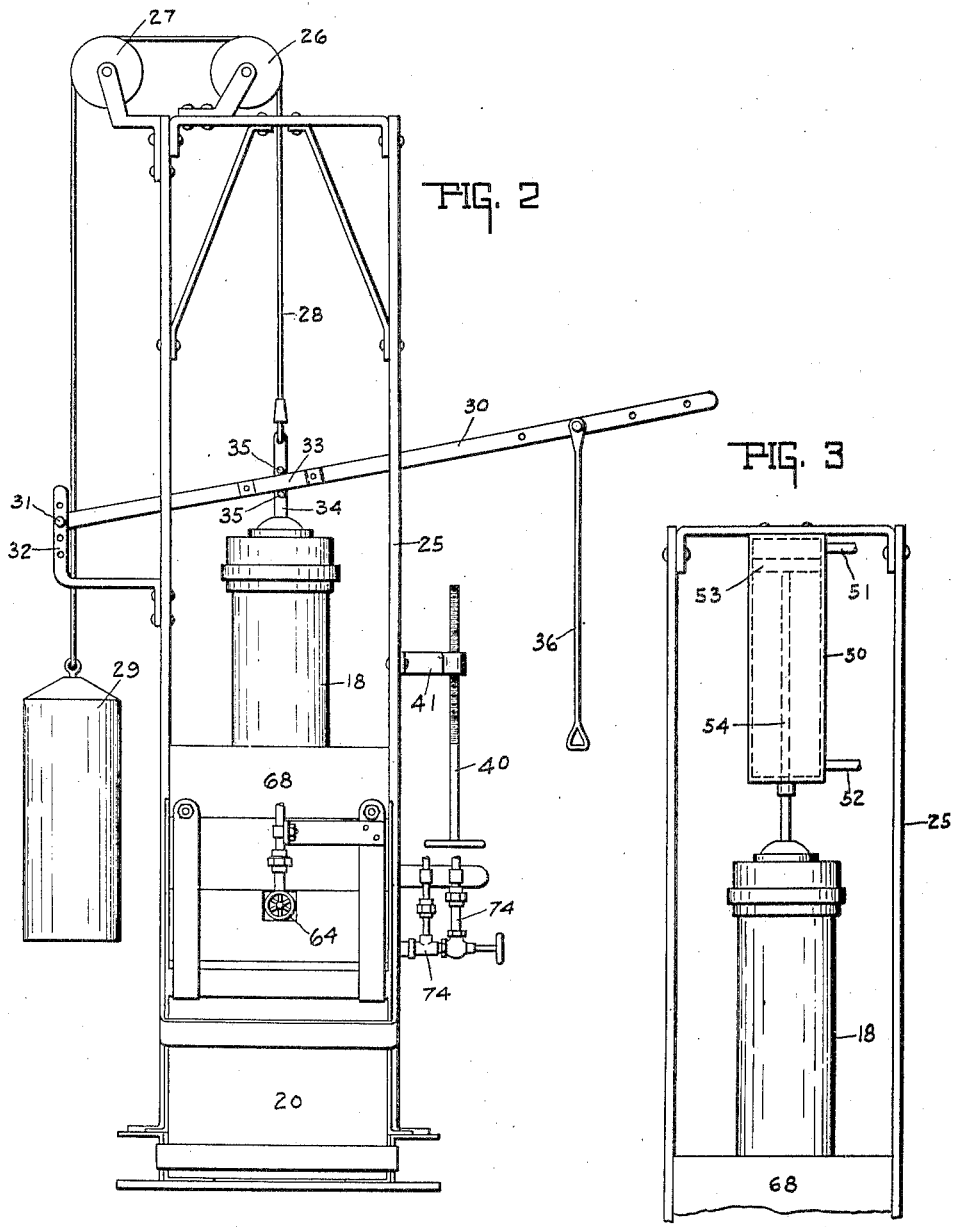

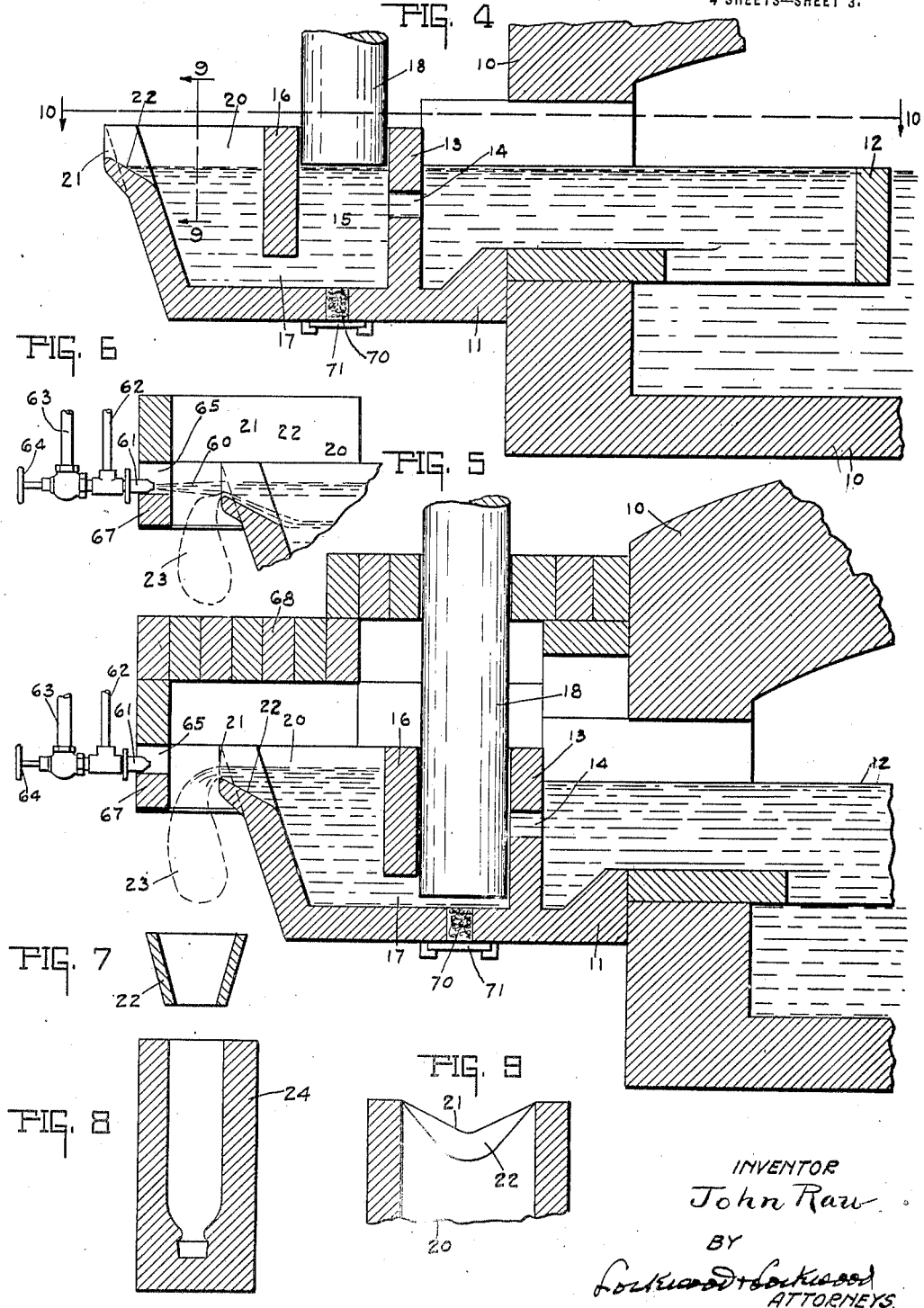

1,329,851.

Patented Feb. 3, 1920.
4 SHEETS—SHEET 4.

INVENTOR.
John Rau
BY
ATTORNEY.

UNITED STATES PATENT OFFICE.

JOHN RAU, OF INDIANAPOLIS, INDIANA.

GLASS-DISCHARGING MECHANISM.

1,329,851.   Specification of Letters Patent.   Patented Feb. 3, 1920.

Application filed September 10, 1918. Serial No. 253,363.

*To all whom it may concern:*

Be it known that I, JOHN RAU, a citizen of the United States, and a resident of Indianapolis, county of Marion, and State of Indiana, have invented a certain new and useful Glass-Discharging Mechanism; and I do hereby declare that the following is a full, clear, and exact description thereof, reference being had to the accompanying drawings, in which like letters refer to like parts.

The object of this invention is to effect a good and satisfactory discharge of molten glass from the spout of a glass tank into molds and the like. It has heretofore been the practice to permit the glass to flow merely by the influence of gravity from the spout into the mold and the stream of glass to be cut off by shears. One difficulty with this mode of charging the molds is that the stream of glass discharges so slowly that it folds back and forth in the mold and forms laps or waves, which mar and often make defective glass articles. This same result occurs whether there is a continuous flow or the stream is sheared for each bottle or article, when it flows in the manner above specified. The shear cuts of the stream of glass also usually leave marks in the article. These objections are so serious that various efforts have been made heretofore to overcome them, and this is the object of the present invention.

The chief feature of this invention consists of means for causing a sudden, quick and forcible overflow of a quantity of molten glass, from the discharge chamber or spout, sufficient to form one bottle or glass article. When the quantity of glass desired thus passes from the spout in one compact, globule-like mass and enters the mold, it will be a solid, homogeneous mass in the mold, free from wrinkles or laps.

The foregoing feature of the invention is accomplished, broadly speaking, by having a reduced discharge chamber with a suitable mouth or discharge outlet and into which chamber the desired quantity of glass is suddenly forced from another chamber by a plunger or the like so as to cause the volume of glass in said discharge chamber to rise very suddenly and cause the globule-like discharge of the glass as above described.

In order to accomplish this object it is also desired, not only that there be a very sudden discharge of glass from the mouth of the discharge chamber but also a very sudden receding of the glass left in the discharge chamber, to cause a quick separation of the discharging mass of glass at the mouth, from the glass remaining in the discharge chamber.

To facilitate the discharging of the glass in the manner mentioned and its severance or separation, without shears, a hot blast is directed against the mouth of the discharge chamber, and therefore against the glass, at the time of the separation of the glass outside of the discharge chamber from the glass remaining within it. This blast causes a quick separation and cleans the mouth of the discharge chamber from threads of glass, as well as keeps the surface of the glass in the discharge chamber heated and the upper part of the walls thereof clean. In this connection the glass is caused to rise in said discharge chamber suddenly to a level higher than the level in the tank, so that when it recedes, after a discharge, a portion of the walls of the discharge chamber will have some adhering glass which will be removed by the blast.

The foregoing and other features of the invention will be understood from the accompanying drawings and the following description and claims.

In the drawings, Figure 1 is a side elevation of a portion of a glass tank, or pot, and means for discharging the glass therefrom into molds or the like. Fig. 2 is a front elevation of the same with the glass tank or pot removed, and showing the device in idle position. Fig. 3 is a front elevation of the upper portion of a modified compressed air means for operating the plunger, the lower part being broken away.

Fig. 4 is a central, vertical, longitudinal section through a portion of the glass tank and through the spout, the lower portion of the plunger being shown in elevated position and the upper part of it being broken away, the top of the spout and also the blast means being omitted.

Fig. 5 is the same with the spout in its downward position and the dicharging mass of glass being indicated by dotted lines, and the top and also the blast means being shown in place.

Fig. 6 is a similar section of the forward portion of the discharging mass, with the blast in operation and the mass of discharging glass being in process of separating from the glass within the discharge chamber, parts being omitted.

Fig. 7 is a central vertical section of a funnel in position to guide the discharging mass of glass.

Fig. 8 is a central vertical section of a press mold in position to receive the glass from the funnel.

Fig. 9 is a section through a part of the discharging chamber on a line 9—9 of Fig. 4.

Figure 10:
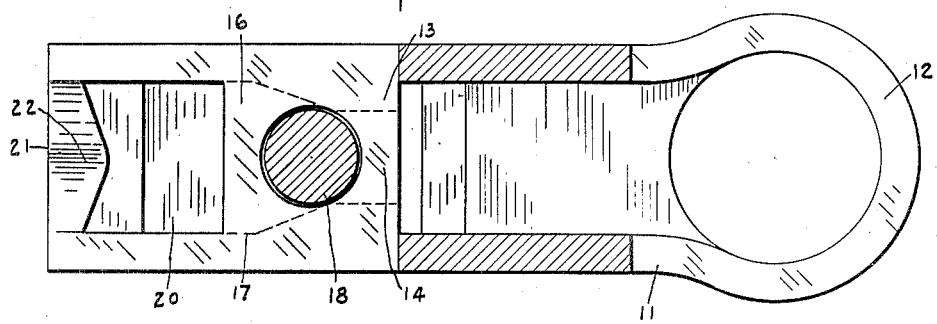
Fig. 10 is a horizontal section on the line 10—10 of Fig. 4.

There is shown in the drawings a glass tank or a pot of any suitable type having a discharge opening in which the spout structure 11 is mounted. The inner end 12 of the spout structure projects into the glass tank or pot for some distance from a point slightly above the level of the glass to a point below the same, and it is open both at the top and bottom, so that the glass rises in said extension and flows through the spout structure. There is a vertical wall 13 in said spout, outside the tank or glass pot, which has a laterally elongated outlet opening 14 into a plunger chamber 15. This chamber is circular, being formed by the side walls and bottom of the spout 11, the wall 13 and an outer wall or partition 16, which does not extend entirely to the bottom, so as to leave a bottom outlet opening 17. A plunger 18 operates vertically in chamber 15 and is about the same diameter as said chamber so that when it is forced downward, from the position shown in Fig. 4 to that shown in Fig. 5, said plunger will force the glass in chamber 15 out of chamber 15 and in doing so will, in the early part of its downward movement, close the outlet opening 14 through which the glass enters the plunger chamber 15.

The glass is forced by the plunger through the outlet opening 17, below partition 16, into the discharge chamber 20 at the outer end of the spout structure. This discharge chamber has an outlet opening or mouth 21 but over the lip thereof and slightly above the normal level of glass in the tank or glass pot, so that the glass will not pass out of the discharge chamber through said mouth excepting when and substantially to the extent that the glass in said discharge chamber is raised, by the action of the plunger, to a higher level than that of the glass in the glass tank or pot. This higher level is indicated in Fig. 5.

The outer end of the discharge chamber 20 slopes upwardly and outwardly to a point below the outlet or mouth so that the glass will rise more freely in said chamber toward the mouth, and the lip 22 of the mouth is also very sloping, as shown in Fig. 4, and projects outwardly so that it overhangs and projects beyond the outer surface of the discharge chamber, whereby the mass of discharging glass 23 will always clear the discharge tank, as it flows over from the mouth thereof. The mouth 21 of the discharge tank is also V shaped, as shown in Fig. 9, so that the discharging glass will be concentrated toward the middle of the mouth of the discharge chamber and the device will operate well when there is only a small amount of glass discharged, as in making small bottles.

There is shown in Fig. 7 a funnel 22 below the mouth of the discharge chamber in position to receive the globule-like mass 23 of discharging glass, and in Fig. 8 there is shown a press mold 24 below the funnel in position to receive the glass from the funnel. These parts shown in Figs. 7 and 8 are old.

The plunger 18 may be operated by any suitable means. The form of such means shown in Fig. 2 is as follows: A rectangular frame 25 is mounted astride the spout and extends above same and carries two sheave wheels 26 and 27 over which a cable 28 from the plunger 18 extends, and an overbalancing weight 29 is secured to the other end of the cable. A lever 30 is fulcrumed at its end by a pin 31 in a bracket 32 secured to the frame 25. It has a side plate 33 secured to it near the middle and spaced from it and through the space a bar 34 which is connected with the plunger, extends upward to the cable 28. Pins 35 are secured to said bar 34 above and below the lever. A handle bar 36 extends downward from the lever 30. When the lever 30 is pulled downward, it will force the plunger downward in the position shown in Fig. 5 and with great force and suddenness close the opening 14 and force all of the glass out of chamber 15 into chamber 20, as shown and explained.

The glass rises in chamber 20, as shown in Fig. 5, to a higher level than in the glass tank or pot and above the mouth of chamber 20 so that it forcibly flows out very suddenly. As soon as the plunger has been forced downward, the handle 30 is immediately released and the weight 29 immediately withdraws the plunger 18 upward. The upward movement of the plunger causes a suction in chamber 15 which, together with the action of gravity, causes the glass in chamber 20 to very quickly and suddenly recede from the mouth and thus cause a separation between the discharging mass of glass and the portion remaining in the discharge chamber. The glass in said chamber will recede to a level below that shown in Fig. 4 as seen in Fig. 5 and until the plunger shall have risen above the inlet opening 14 to the chamber 15. Then the glass from the glass tank or pot will flow into chambers 15 and 20 and restore the level of glass in both chambers to the level of the glass in the tank, as shown in Fig. 4.

It is thus seen that the chamber 15 is in the nature of a measuring chamber for determining the amount of glass to be discharged at one operation, but the amount of glass discharged from said chamber may be varied considerably to adapt the quantity of glass discharged at each operation to the size of the bottle or glass article being made. This is preferably done by limiting the downward movement of the plunger 18. Such limiting means is shown in Fig. 2 and consists of a stop screw 40 vertically disposed in screwing through an arm 41 secured to the frame 25 and in position to stop the downward movement of the lever 30. By screwing the rod 40 upward, the extent of movement of the plunger will be reduced and therefore a corresponding reduction be caused in the quantity of glass discharged. The mouth 21 of the discharge chamber is V shaped so that whether the quantity of glass discharged is great or small, it will be discharged centrally therefrom.

While a hand operated means for actuating the plunger 18 is shown in Figs. 1 and 2, an air compressed means is shown in Fig. 3. There a compressed air cylinder 50 is secured to the top of the frame 25 and has a compressed air inlet pipe 51 entering the upper end thereof and another pipe 52 entering the lower end. Within said cylinder and between the two compressed air pipes 51 and 52 there is a piston 53 and piston rod 54 connected therewith and extending down to the plunger 18. When compressed air is introduced into the upper end of said cylinder, the plunger will be suddenly forced downward in the position shown in Fig. 5. Compressed air then entering through pipe 52, below the piston, will cause the plunger to be lifted. The means for controlling the pipes 51 and 52 and the exhaust therefrom are not shown, but will be understood by all skilled in the art.

The discharging globule of glass may be severed by shears, if desired, although, when the glass recedes suddenly in the discharge tank there will be very little glass to sever. It is not desirable, however, to sever glass by shears if it can be avoided as the cut surface may mark or mar the article to some extent. The preferable means for facilitating the separation of the glass is by the flame or blast 60 coming from the nozzle 61 which is supplied with a gas pipe 62 and an air pipe 63 and is controlled by a valve 64. This nozzle extends into an opening 65 in front of the middle of the mouth of the discharge chamber so as to discharge a flame 60 against the top surface of the glass in and to the rear of the mouth of said chamber. This blast not only thus melts off the glass at the mouth and facilitates its separation, but cleans the mouth and prevents threads of glass at that point. It also extends into the discharge chamber and heats the top surface thereof and keeps the side walls thereof clean.

To facilitate in heating the glass at the mouth, the mouth is protected by a surrounding wall 67 through which the opening 65 extends and also there is a cover or top 68 over the spout 11, as seen in Fig. 5.

There is a drain opening 70 in the bottom of chamber 15 for draining the outer portion of the spout and it is adapted to be closed by an asbestos plug 71 and held in by a removable plate 72, mounted in connection with the bottom of the spout. There are pipes 74 for supplying fuel to the structure.

Figure 11:
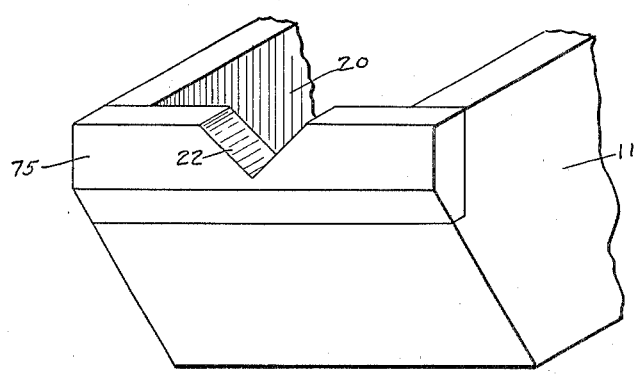
Fig. 11 is a perspective view of the outer end of the discharge chamber, showing a modified construction.

In Fig. 11 there is shown a modified form of construction of the outer end of the spout 11. In the upper part of the front end of the chamber 20 there is a transversely extending recess for receiving a rectangular member 75 in which the mouth 21 of the discharge chamber is formed. This member 75 is interchangeable with other similar members having V shaped mouths of different sizes to suit different kinds of glassware.

The invention claimed is:

1. The combination with a glass tank, of a spout structure attached thereto having a transverse partition therein next to the glass tank with an inlet opening therefrom above the lower end thereof and a second partition between said first mentioned partition and the outlet end of the tank which has an outlet opening at the bottom thereto, said partitions being arranged to form a displacement chamber between them and a relatively large discharge chamber at the outer end and with an outlet mouth therefrom on a lower level than the top of said discharge chamber, and a displacement plunger operating in said displacement chamber for closing the outlet from the tank and raising the level of the glass in the discharge chamber for causing the discharge thereof, substantially as set forth.

2. The combination with a glass tank, of a spout structure having in the outlet end thereof a discharge chamber with an outlet mouth, an intermediate chamber between said discharge chamber and tank and smaller than the discharge chamber and having an outlet from the lower end thereof to the discharge chamber, and a plunger operating in said intermediate chamber for forcing the glass therefrom into the discharge chamber, substantially as and for the purpose set forth.

3. The combination with a glass tank, of a glass discharge chamber with an outlet mouth, an intermediate chamber between said discharge chamber and the tank in position to receive the glass from the tank and discharge the same from the lower end thereof to the discharge chamber, a plunger adapted to be moved downward in the intermediate chamber forcing the glass therefrom into the discharge chamber level above the mouth, and means for causing the immediate and rapid return upward movement of the plunger, whereby the suction created thereby will cause an immediate receding of the glass in the discharge chamber to a level below the mouth thereof.

4. The combination with a glass tank, of a glass discharge chamber with an outlet mouth, an intermediate chamber between said discharge chamber and the tank in position to receive the glass from the tank and discharge the same from the lower end thereof to the discharge chamber, a plunger adapted to be moved downward in the intermediate chamber forcing the glass therefrom into the discharge chamber level above the mouth, a lever for giving said plunger a downward movement, and an overbalancing weight acting on said plunger for causing its immediate upward return movement.

5. The combination with a glass tank, of a glass discharge chamber with an outlet mouth, an intermediate chamber between said discharge chamber and the tank in position to receive the glass from the tank and discharge the same from the lower end thereof to the discharge chamber, a plunger adapted to be moved downward in the intermediate chamber forcing the glass therefrom into the discharge chamber to a level above the outlet mouth, a frame extending above the said chambers and plunger, a sheave wheel on said frame, a cable on said sheave wheel connected at one end to the plunger, an overbalancing weight connected to the other end of the cable, and a lever fulcrumed to the frame and in operative connection with the plunger for causing its downward movement.

In witness whereof, I have hereunto affixed my signature.

JOHN RAU.